United States Patent
Samukawa et al.

[19]

[11] Patent Number: 5,971,844
[45] Date of Patent: Oct. 26, 1999

[54] AIR CONDITIONING SYSTEM FOR AUTOMOTIVE VEHICLES

[75] Inventors: Katsuhiko Samukawa, Oobu; Yuji Honda, Okazaki; Tatsumi Kumada, Gamagori; Tomoyuki Kako, Toyota, all of Japan

[73] Assignee: Denso Corporation, Kariya, Japan

[21] Appl. No.: 09/099,298

[22] Filed: Jun. 18, 1998

[30] Foreign Application Priority Data

Jul. 17, 1997 [JP] Japan .................................. 9-192931

[51] Int. Cl.$^6$ ...................................................... B60H 1/32
[52] U.S. Cl. .............................................. 454/75; 454/139
[58] Field of Search .............................. 62/244; 165/271, 165/41, 42; 454/75, 139, 158

[56] References Cited

U.S. PATENT DOCUMENTS

| | | | |
|---|---|---|---|
| 4,007,875 | 2/1977 | Stolz et al. ........................... | 62/244 X |
| 4,458,583 | 7/1984 | Fukui et al. .......................... | 454/75 |
| 4,733,605 | 3/1988 | Holter et al. ........................ | 454/158 |
| 5,486,138 | 1/1996 | Sorensen .............................. | 454/75 |

FOREIGN PATENT DOCUMENTS 56-39911  4/1981  Japan .

*Primary Examiner*—Harold Joyce
*Attorney, Agent, or Firm*—Harness, Dickey & Pierce, PLC

[57] ABSTRACT

An automotive air conditioning system designed to switch a ventilation mode to an air recirculation mode automatically when the contamination of outside air is greater than a given level. The system includes a mode selection prohibiting circuit that prohibits the switching between the air recirculation mode and the ventilation mode and operates the air conditioning system in the ventilation mode when the vehicle is traveling at high speeds or when the outside temperature is relatively low. This allows fresh air having a relatively lower humidity to be drawn into the passenger compartment, thereby avoiding fogging of inner surfaces of windows of the vehicle.

4 Claims, 5 Drawing Sheets

5,971,844

AIR CONDITIONING SYSTEM FOR AUTOMOTIVE VEHICLES

BACKGROUND OF THE INVENTION

1. Technical Field of the Invention

The present invention relates generally to an automotive air conditioning system designed to automatically switch between an air recirculation mode and a ventilation mode according to a measure of contamination of ambient air, and more particularly to such an automotive air conditioning system designed to control the switching between the air recirculation mode and the ventilation mode according to the vehicle speed.

2. Background of Related Art

Automotive air conditioning systems are known in the art which has an air contamination sensor disposed outside of a passenger compartment of a vehicle and which switches a ventilation mode to an air recirculation mode automatically when it is determined based on a sensor output that surrounding air is polluted (which will be referred hereinafter as automatic recirculation/ventilation mode control).

Usually, in winder, when an automotive vehicle is traveling at high speeds, window glasses are blown by the lower-temperature wind and cooled, so that they are fogged up easier than when the vehicle is parked.

As compared with when the vehicle is parked, the flow rate of air discharged from an air conditioner in the ventilation mode is increased by the traveling-induced wind, but it is kept in the air recirculation mode whether the vehicle is traveling or parked.

In analysis of air conditioning comfort in the above conventional air conditioning systems during traveling of the vehicle, the inventors of this application have encountered the following problems.

When the vehicle travels at a high speed during air conditioning operation in the automatic recirculation/ventilation mode control, the air recirculation mode is entered so that window glasses become apt to be fogged, which may obstruct the view of the driver.

When switching between the air recirculation mode and the ventilation mode is performed during traveling of the vehicle at a high speed (e.g., 150 km/h), it will result in a great difference in flow rate of air discharged to a passenger compartment with which vehicle occupants feel uncomfortable.

SUMMARY OF THE INVENTION

It is therefore a principal object of the present invention to avoid the disadvantages of the prior art.

It is another object of the present invention to provide an automotive air conditioning system designed to control switching between recirculation and ventilation modes according to the vehicle speed to avoid fogging of window glass and eliminate discomfort of vehicle passengers due to a difference in flow pressure of air discharged to a passenger compartment between the recirculation mode and the ventilation mode.

According to one aspect of the present invention, there is provided an air conditioning system for vehicle which comprises: (a) an air conditioner unit that conditions and discharges air to a passenger compartment of the vehicle; (b) an outside air contamination sensor that determines contamination of air outside the vehicle; (c) an automatic mode selecting circuit that selects an air recirculation mode in which the air discharged from the air conditioner unit is recirculated through the passenger compartment when the contamination of the air determined by the outside air contamination sensor is greater than a preselected reference level and selects a ventilation mode in which the outside air is drawn into the passenger compartment when the contamination of the air is smaller than the preselected reference level; (d) a vehicle speed sensor that determines a speed of the vehicle; and (e) a mode selection prohibiting circuit that prohibits a mode selection operation of the automatic mode selecting circuit and selects the ventilation mode when the speed of the vehicle determined by the vehicle speed sensor is greater than a preselected value.

In the preferred mode of the invention, the air conditioner unit includes a blower which produces an air flow directed to the passenger compartment. A flow rate control circuit is further provided which controls the blower so that flow rates of air discharged by the blower in the air recirculation mode and the ventilation mode agree with each other.

The flow rate control circuit includes a target flow rate determining circuit, a correction value determining circuit, and a target flow rate correcting circuit. The target flow rate determining circuit determines a target flow rate of air discharged by the blower based on a preselected controlled air conditioning parameter. The correction value determining circuit determines correction values for correcting the target flow rate determined by the target flow rate determining circuit in the air recirculation mode and the ventilation mode, respectively. The correction value in the ventilation mode decreases the target flow rate of air as the speed of the vehicle determined by the vehicle speed sensor increases. The target flow rate correcting circuit corrects the target flow rate determined by the target flow rate determining circuit using the correction values determined by the correction value determining circuit so that the flow rates of air discharged by the blower in the air recirculation mode and the ventilation mode agree with each other.

The mode selection prohibiting circuit also prohibits the mode selection operation of the automatic mode selecting circuit and selects the ventilation mode when a temperature of the air outside of the vehicle is smaller than a preselected value.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
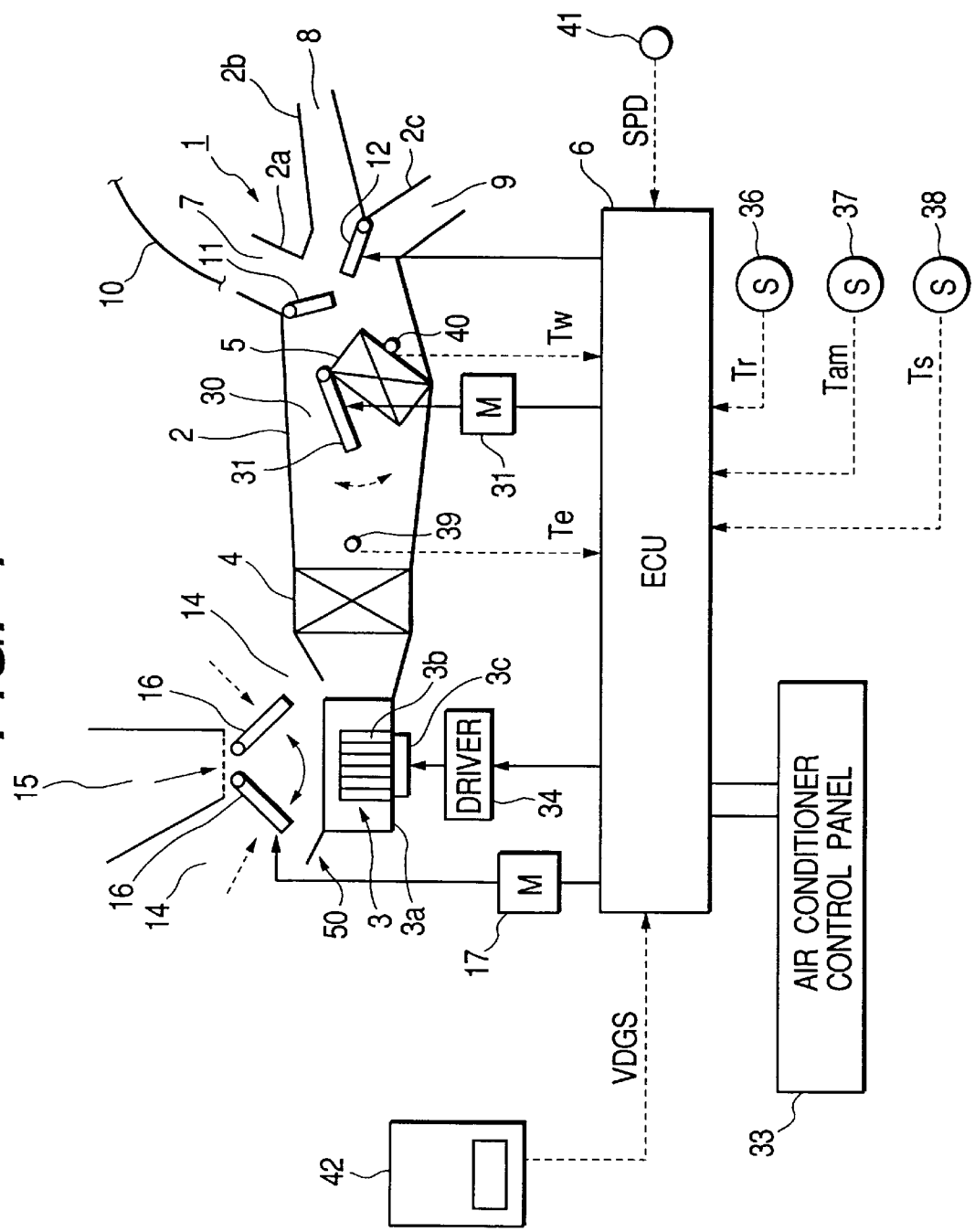
FIG. 1 is a schematic view which shows a structure of an air conditioning system according to the present invention.

Referring now to the drawings, particularly to FIG. 1, there is shown an automotive air conditioning system 1 according to the present invention which includes an air conditioner casing 2 defining therein an air duct opening to a passenger compartment of the vehicle, a blower 3, an evaporator 4, a heater core 5, and an air conditioner electrically control unit (ECU) 6.

Three distribution ducts 2a to 2c extend on the downstream side of the air conditioner casing 2. The distribution duct 2a is connected to a defroster outlet 7 from which air is discharged to an inner surface of window glass 10. The distribution duct 2b is connected to a face outlet 8 from which air is discharged to an upper half of a passenger body. The distribution duct 2c is connected to a foot outlet 9 from which air is discharged to feet of passengers. Air flow to the distribution duct 2a is controlled by a defroster door 11. Air flows to the distribution ducts 2b and 2c are controlled by an outlets door 12. The doors 11 and 12 are moved by a servo motor through a link mechanism (not shown).

The air conditioning system 1 is designed to discharge conditioned air to the passenger compartment selectively in one of three known air distribution modes: a FACE mode, a B/L (Bi-Level) mode, and a FOOT mode. In the FACE mode, the conditioned air is discharged from the face outlet 8. In the B/L mode, the conditioned air is discharged from the face outlet 8 and the foot outlet 9. In the FOOT mode, the conditioned air is discharged from the defroster outlet 7 and the foot outlet 7.

The blower 3 includes a blower casing 3a, a centrifugal fan 3b, and a blower motor 3c. The flow rate of air discharged from the blower 3 is controlled by the level of voltage applied to the blower motor 3c.

The blower casing 3a is connected at an inlet thereof to an air inlet door assembly 50. The air inlet door assembly 50 has formed therein an inside air inlet 14 through which the air in the passenger compartment is conducted to the air conditioner casing 2 and an outside air inlet 15 through which fresh air is conducted to the air conditioner casing 2. The outside air inlet 15 communicates with an air inlet (not shown) formed in an upper cowl of the vehicle.

The air inlet door assembly 50 has disposed therein two air doors 16 moved by a servomotor 17 to control the quantity of inside air flowing from the inside air inlet 14 to the air conditioner casing 2 and the quantity of outside air flowing from the outside air inlet 15 to the air conditioner casing 2.

The air conditioning system 1 operates in one of two modes: an air recirculation mode and a ventilation mode automatically and manually. In the air recirculation mode, the inside air inlet is opened, while the outside air inlet 15 is closed to recirculate the air through the air conditioner casing 2 and the passenger compartment. In the ventilation mode, the inside air inlet is closed, while the outside air inlet is opened to withdraw fresh air into the air conditioner casing 2.

The evaporator 4 is one component of a known air conditioner refrigeration system which also includes a compressor, a condenser, a receiver, and an expansion valve (not shown). The evaporator 4 is installed in the air conditioner casing 2 and evaporates refrigerant liquid entering from the expansion valve to cool the air discharged from the blower 3.

The heater core 5 is installed in the air conditioner casing 2 downstream of the evaporator 4 and warms the air with the heat of engine coolant. A bypass line 30 extends in the air conditioner casing 2 through which the air cooled by the evaporator 4 bypasses the heater core 5. The flow rate ratio of air passing through the bypass line 30 to air passing through the heater core 5 is controlled by an air mixing door 31 which is pivotably moved by a servomotor 31 through a link mechanism (not shown).

The ECU 6 consists of a microcomputer storing therein control programs for air conditioning, ROMs, RAMs, an I/O port, and an A/D converter and is responsive to a signal inputted from an air conditioner control panel 33 to provide control signals to the servomotors 17 and 31 and a motor driver 34 which controls the blower motor 3c.

The air conditioning system 1 also includes an inside temperature sensor 36, an outside temperature sensor 37, a solar sensor 38, an evaporator temperature sensor 39, a water temperature sensor 40, and a vehicle speed sensor 41. The inside temperature sensor 36 measures the temperature of air in the passenger compartment. The outside temperature sensor 37 measures the temperature of ambient air. The solar sensor 38 is sensitive to sun light to provide a signal indicative of the quantity of solar radiation. The evaporator temperature sensor 39 measures the temperature of air immediately after passing through the evaporator 4. The water temperature sensor 40 is attached to an outer surface of the heater core 5 and measures the temperature of coolant of the engine. The vehicle speed sensor 41 is made of a known electromagnetic pickup designed to measure the speed of a wheel.

The air conditioning system 1 further includes a gas sensor 42 which is installed in an engine compartment of the vehicle and which is designed to measure the contamination of ambient air to provide a signal indicative thereof to the ECU 6. The gas sensor 42 includes a semiconductor device made of, for example, $SiO_2$ sensitive to a harmful gas such as carbon monoxide (CO) or hydrocarbon (HC) and outputs a sensor signal having an output voltage VDGS which drops as the concentration of harmful gas (i.e., the contamination of ambient air) is increased.

The air conditioner control panel 33 is mounted in an instrument panel in the passenger compartment and has disposed thereon a temperature selector (not shown) for manually selecting a desired temperature of the inside air, a blowing mode selector (not shown) for manually selecting desired one of known blowing modes (i.e., the FACE, B/L, and FOOT modes), and an air recirculation/ventilation mode switch (not shown) which switches between the ventilation mode and the air recirculation mode. These selectors and switch are known in the art, and explanation thereof in detail will be omitted here.

With the above arrangements, the air conditioning system 1 automatically controls the temperature of air in the passenger compartment to a desired level that is manually selected by an operator through the air conditioner control panel 33.

Figure 2:
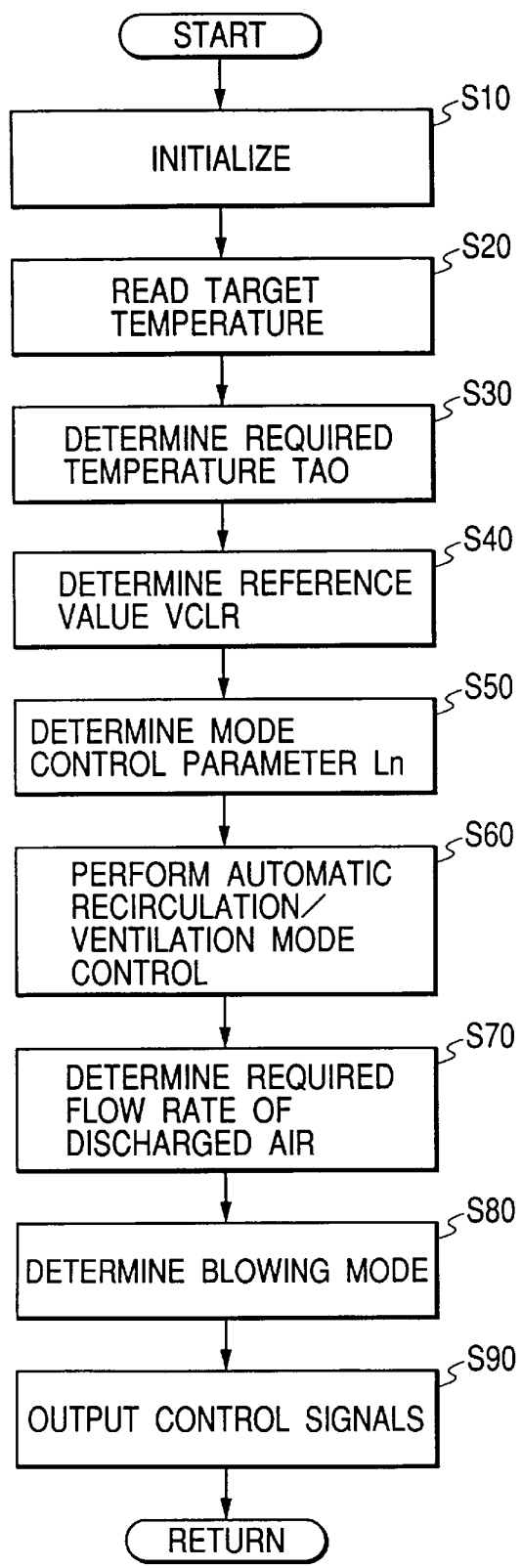
FIG. 2 is a flowchart of an automatic air conditioning program performed by the air conditioning system of FIG. 1.

FIG. 2 is a flowchart of an automatic air conditioning control program performed by the ECU 6.

When an ignition switch of the vehicle is turned on to supply the power to the ECU 6, the routine enters the program and proceeds to step 10 wherein counters and flags are reset.

The routine proceeds to step 20 wherein a target temperature value Tset is read which indicates a desired temperature of inside air manually selected by the operator through the air conditioner control panel 33, and control parameters Tr, Tam, Ts, Te, Tw, SPD, VDGS into which outputs of the sensors 36 to 42 are A/D converted and the states of the selectors and switch on the air conditioner control panel 33 are monitored.

The routine proceeds to step 30 wherein a required temperature TAO (i.e., a required quantity of heat) of conditioned air to be discharged to the passenger compartment is determined using the equation (1) below.

$$TAO = Kset \times Tset - Kr \times Tr - Kam \times Tam - Ks \times Ts + C \quad (1)$$

where Kset, Kr, Kam, and Ks are given gains, and C is a correction constant.

The routine proceeds to step 40 wherein a reference value VCLR is determined which is used in determining the concentration of harmful gas (i.e., a measure of contamination of outside air) through the gas sensor 42. The gas sensor 42 includes, as described above, the semiconductor device which usually has an inevitable unit-to-unit deviation in detection accuracy and which is subject to change in output due to variation in humidity. It is, thus, difficult to indicate the concentration of gas in an absolute value. For this reason, the air conditioning system 1 of this embodiment determines the contamination of outside air based on a deviation of an actual output of the gas sensor 42 from the reference value VCLR.

The reference value VCLR is given by the equation (2) below.

$$VCLR \leftarrow max(VCLR, VDGS) \quad (2)$$

where VDGS is a voltage output of the gas sensor 41 that drops, as described above, as the concentration of harmful gas is increased. The reference value VCLR is, thus, set to a value representing the cleanest air after the program is initiated.

The routine proceeds to step 50 wherein an automatic recirculation/ventilation mode control parameter Ln, as will be discussed later in detail, is determined, using the concentration of gas VDGS read in step 20, as:

$$Ln = VDGS/VCLR \quad (3)$$

Specifically, the automatic recirculation/ventilation mode control parameter Ln corresponds to the deviation of an actual output of the gas sensor 42 from the reference value VCLR that represents a measure of contamination of outside air. Note that as the outside air becomes dirty, the automatic recirculation/ventilation mode control parameter Ln has a smaller value.

The use of the parameter Ln, thus, enables the contamination of outside air to be determined precisely regardless of the unit-to-unit deviation in detection accuracy and change in output of the gas sensor 42 due to variation in humidity.

The routine proceeds to step 60 wherein the automatic recirculation/ventilation mode control is performed, as will be described later in detail, to select one of the air recirculation mode and the ventilation mode according to the concentration of gas VDGS and the vehicle speed.

The routine proceeds to step 70 wherein a required flow rate of air discharged from the blower 5 is determined in a manner as described later in detail.

The routine proceeds to step 80 wherein the blowing mode is automatically determined based on the required temperature TAO of conditioned air determined in step 30. Specifically, as the required temperature TAO increases, the blowing mode is changed in sequence from the FACE mode to the B/L and FOOT modes in that order. Further, a target opening SW of the air mixing door 31 is determined based on TAO, Te, and Tw so as to bring the temperature of conditioned air discharged to the passengers compartment into agreement with the required temperature TAO.

While either of the air recirculation mode and the ventilation mode is selected in step 60 according to the concentration of gas VDGS, it may also be determined based on the required temperature TAO regardless of the concentration of gas VDGS. For example, when it is required to cool the passenger compartment rapidly in summer, the required temperature TAO drops below a threshold level, thereby causing the air recirculation mode to be entered. When the air recirculation mode is selected based on the required temperature TAO, it is kept irrespective of an operation in step 60.

The routine proceeds to step 90 wherein the ECU 60 outputs control signals to achieve target controlled variables determined in steps 60 to 80.

Next, the details of steps 60 and 70 will be presented below.

Figure 3:
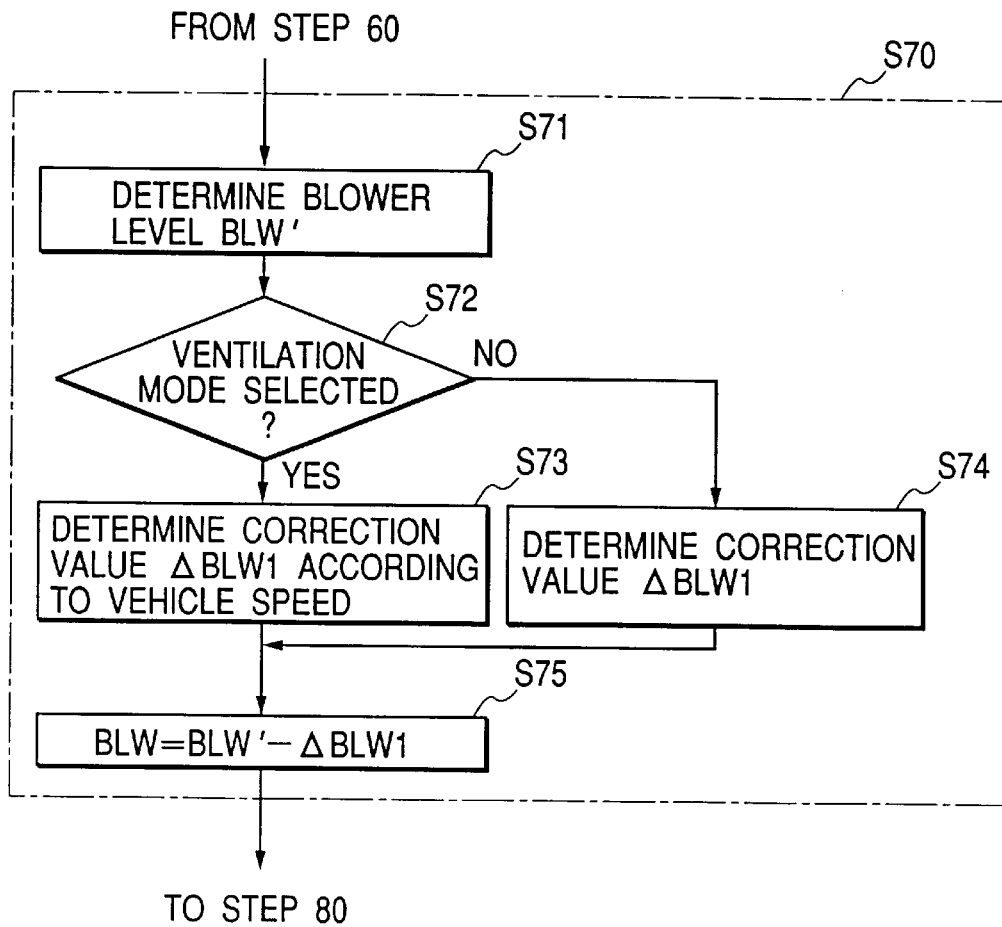
FIG. 3 is a flowchart of a subprogram performed in step 70 in FIG. 2.

FIG. 3 shows a subprogram performed in step 70. First, in step 71, a target blower level BLW' (i.e., the target flow rate of air discharged from the blower 5) is determined by look-up using a map shown in FIG. 4 based on the required temperature TAO. The routine proceeds to step 72 wherein it is determined whether the ventilation mode has been selected in step 60 or not. If a YES answer is obtained, then the routine proceeds to step 73. Alternatively, if a NO answer is obtained meaning that the air recirculation mode has been selected in step 60, then the routine proceeds to step 74.

Figure 5:
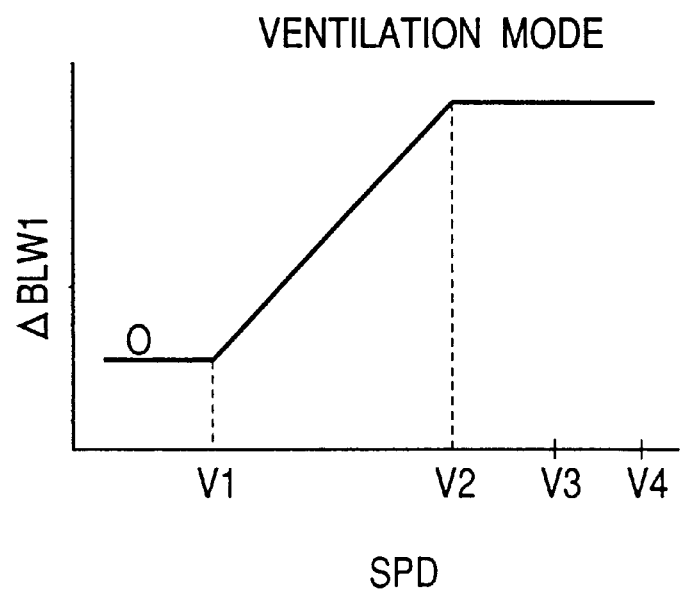
FIG. 5 shows a map used in determining a correction value for a target flow rate of air discharged by a blower in a ventilation mode.

In step 73, a correction value (i.e., a correction blower level) ΔBLW1 in the ventilation mode is determined by look-up using a map shown in FIG. 5 based on the vehicle speed SPD monitored by the vehicle speed sensor 41. Specifically, when the vehicle speed SPD is less than V1 (e.g., 50 km/h), the correction value ΔBLW1 is determined to be zero (0). When the vehicle speed SPD is higher than V1 and lower than V2 (e.g., 120 km/h), the correction value ΔBLW1 is increased according to an increase in SPD. When the vehicle speed SPD is higher than V2, the correction value ΔBLW1 is kept constant.

Figure 6:
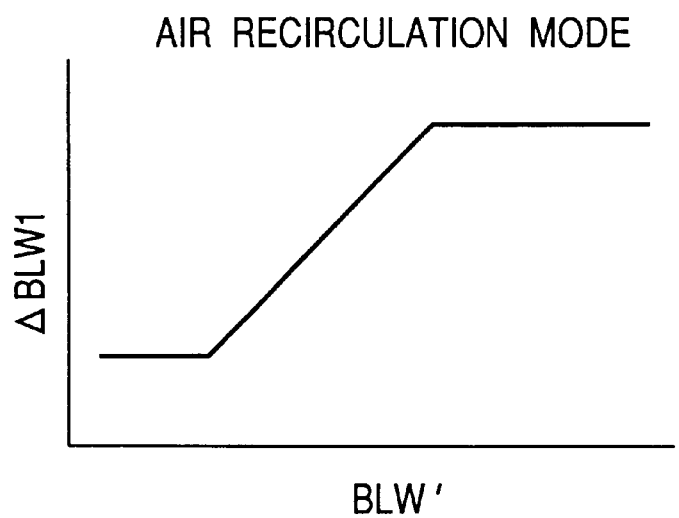
FIG. 6 shows a map used in determining a correction value for a target flow rate of air discharged by a blower in an air recirculation mode.

In step 74, a correction value (i.e., a correction blower level) ΔBLW1 in the air recirculation mode is determined by look-up using a map shown in FIG. 6 based on the target blower level BLW' derived in step 71. Specifically, the correction value ΔBLW1 is increased as the target blower level BLW' is increased.

In step 75, the target blower level BLW' is corrected using the equation (4) below to determine a final target blower level BLW.

$$BLW = BLW' - \Delta BLW1 \quad (4)$$

Specifically, the final target blower level BLW is determined by subtracting the correction value ΔBLW1 from the target blower level BLW'. This is for the following reason.

Figure 4:
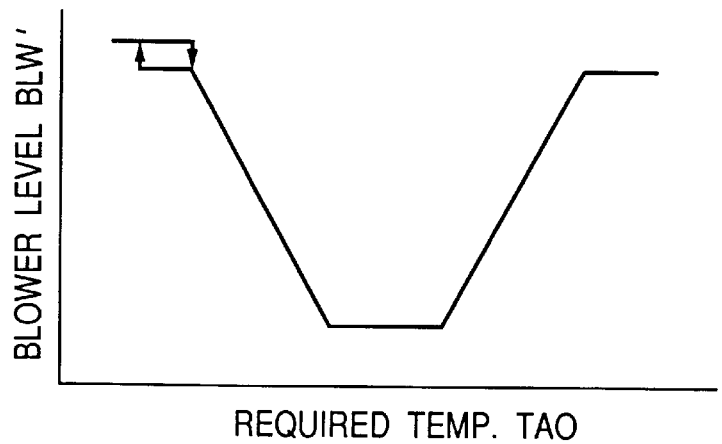
FIG. 4 shows a map used in determining a flow rate of air discharged by a blower in terms of a required temperature of the discharged air.

When the vehicle is traveling in the ventilation mode, an actual flow rate of air discharged to the passenger compartment, as described above, exceeds a target flow rate thereof due to the traveling-induced wind. For example, if the relation between the blower level BLW' and the required temperature TAO in FIG. 4 is determined on the assumption that the vehicle speed SPD is zero (0), the actual flow rate of discharged air becomes greater than the target flow rate thereof as the vehicle speed is increased. The agreement of the actual flow rate of discharged air with the target flow rate in the ventilation mode is, thus, accomplished as described above by determining the final target blower level BLW based on the target blower level BLW' which becomes small as the vehicle speed SPD increases.

In the air recirculation mode, the actual flow rate of air discharged to the passenger compartment is not affected by the traveling of the vehicle, but the map in FIG. 4 is made for the ventilation mode, and thus, the final target blower level BLW in the air recirculation mode needs to be corrected. This is because the flow resistance of conditioned air differs between the air recirculation mode and the ventilation mode. Specifically, in the air conditioning system 1 of this embodiment, the air recirculation mode is smaller in flow resistance than the ventilation mode because of a physical air duct structure of the air conditioning system 1. Therefore, even when the vehicle speed SPD is zero (0) so that there is no traveling-induced wind, and the target blower levels BLW' in the air recirculation and ventilation modes are equal to each other, the actual flow rate of discharged air in the air recirculation mode becomes greater than that in the ventilation mode. In order to eliminate the difference in actual flow rate of discharged air between the air recirculation mode and the ventilation mode which would cause discomfort of the vehicle passengers, the air conditioning system 1 of this embodiment corrects, as described above, the target blower level BLW' in the air recirculation mode even when the vehicle speed is zero (0).

Figure 7:
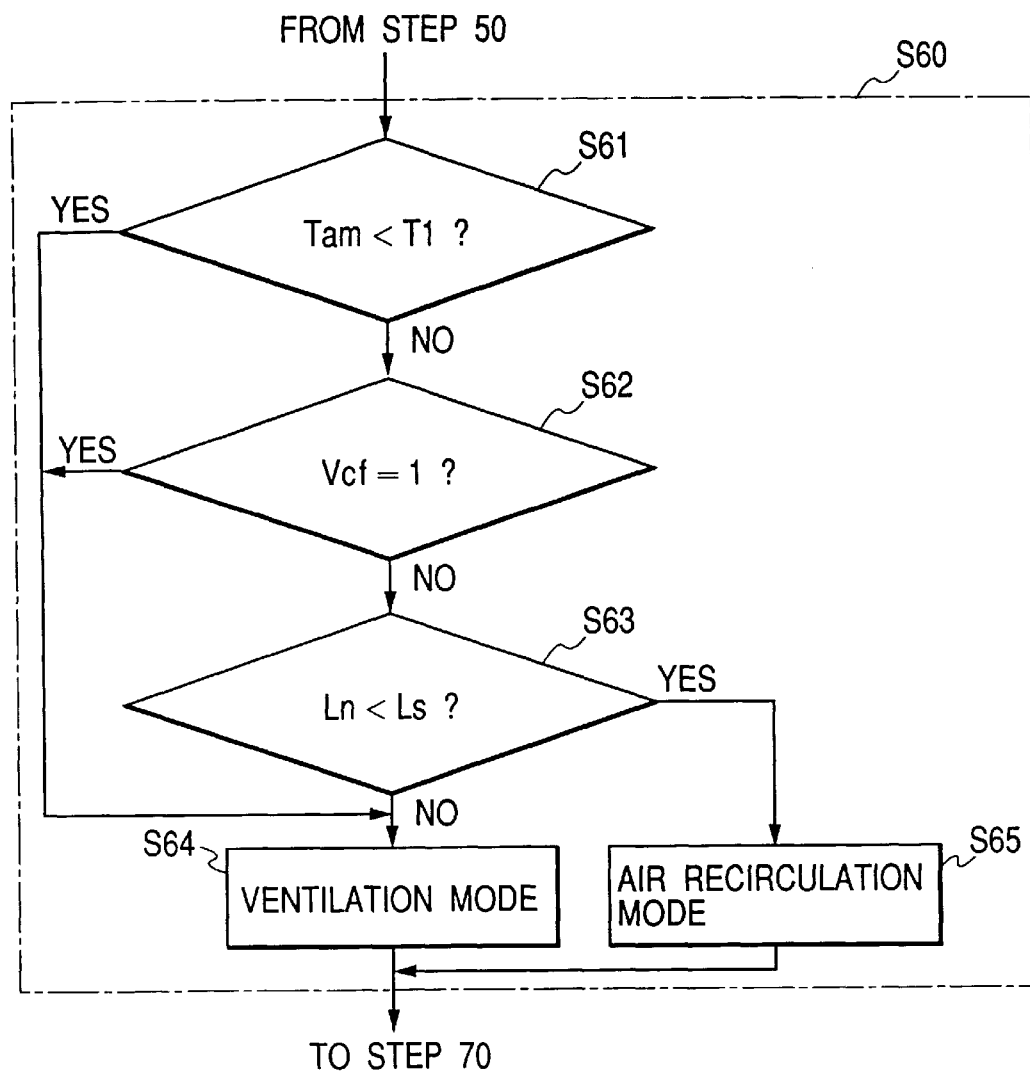
FIG. 7 is a flowchart of a subprogram performed in step 60 in FIG. 2.

FIG. 7 shows a subprogram performed in step 60. Note that when the air conditioning system 1 is operating in a manual mode, the subprogram below is not performed.

First, in step 61, it is determined whether the outside temperature Tam measured by the outside air temperature sensor 37 is lower than a given value T1 (e.g., 0° C.) or not. If a YES answer is obtained (Tam<T1), then the routine proceeds to step 64 to select the ventilation mode.

Figure 8:
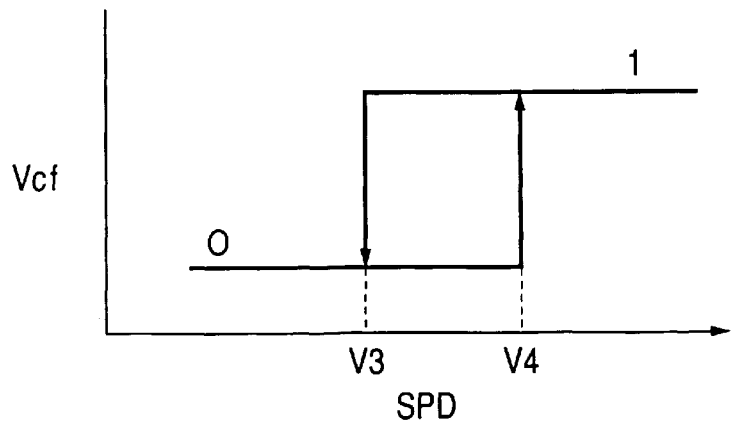
FIG. 8 shows a map used in determining a vehicle speed dependent control parameter Vcf for prohibiting an air recirculation/ventilation mode switching operation based on a vehicle speed.

Alternatively, if a NO answer is obtained (Tam>T1) in step 61, then the routine proceeds to step 62 wherein it is determined whether a vehicle speed dependent control parameter Vcf is equal to one (1) or not. The vehicle speed dependent control parameter Vcf is determined by look-up using a map shown in FIG. 8. Specifically, when the vehicle speed SPD is greater than a given value V4 (e.g., 150 km/h), Vcf=1, while when the vehicle speed SPD is smaller than the value V4, Vcf=0. A hysteresis is provided in the map of FIG. 8 for avoiding the hunting of the air doors 16. Specifically, a change in Vcf from one to zero is made when the vehicle speed SPD drops below V3 (e.g., 130 km/h).

If a YES answer is obtained (Vcf=1) in step 62, then the routine proceeds to step 64 to select the ventilation mode. Alternatively, if a NO answer is obtained, then the routine proceeds to step 63 wherein it is determined whether the automatic recirculation/ventilation mode control parameter Ln derived in step 50 is smaller than a reference value Ls or not. The reference value Ls is a criterion of contamination of outside air with which vehicle passengers feel uncomfortable. When the outside air is contaminated, the output VDGS of the gas sensor 42 shows, as described above, a smaller value. Thus, if the automatic recirculation/ventilation mode control parameter Ln is smaller than the reference value Ls, it means that the outside air is polluted to the extent that the vehicle passengers feel uncomfortable, and the routine proceeds to step 65 wherein the air recirculation mode is selected to avoid entrance of the outside air.

Alternatively, if a NO answer is obtained (Vcf≠1) in step 63, meaning that the outside air is not polluted to the extent that the vehicle passengers feel uncomfortable, then the routine proceeds to step 64 to select the ventilation mode.

As apparent from the above discussion, the automatic recirculation/ventilation mode control based on the contamination of outside air (i.e., steps 63, 64, and 65) is performed when the outside temperature Tam is higher than the given value T1 and when the vehicle is traveling at lower speeds. In other words, when the vehicle is traveling at high speeds, that is, if a YES answer is obtained in step 62, then the automatic recirculation/ventilation mode control is prohibited, and in step 64, the ventilation mode is selected. Additionally, when the outside temperature is relatively low, that is, if a YES answer is obtained in step 61, then the automatic recirculation/ventilation mode control is prohibited, and in step 64, the ventilation mode is selected. This allows fresh air having a relatively lower humidity to be conducted into the passenger compartment when the outside temperature is low or when the vehicle is traveling at high speeds, thereby avoiding fogging of the windows.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the automatic recirculation/ventilation mode control is prohibited when the vehicle speed increases above V4 (=150 km/h), but it may alternatively be prohibited when the vehicle increases above V2 (=120 km/h).

The air doors 16 are made of plate members, but may alternatively be made of a rotary door assembly or film-made fins.

What is claimed is:

1. An air conditioning system for vehicle comprising:

an air conditioner unit that conditions and discharges air to a passenger compartment of the vehicle;

an outside air contamination sensor that determines contamination of air outside the vehicle;

an automatic mode selecting circuit that selects an air recirculation mode in which the air discharged from said air conditioner unit is recirculated through the passenger compartment when the contamination of the air determined by said outside air contamination sensor is greater than a preselected reference level and selects a ventilation mode in which the outside air is drawn into the passenger compartment when the contamination of the air is smaller than the preselected reference level;

a vehicle speed sensor that determines a speed of the vehicle; and a mode selection prohibiting circuit that prohibits a mode selection operation of said automatic mode selecting circuit and selects the ventilation mode when the speed of the vehicle determined by said vehicle speed sensor is greater than a preselected value.

2. An air conditioning system as set forth in claim 1, wherein said air conditioner unit includes a blower which produces an air flow directed to the passenger compartment, and further comprising a flow rate control circuit that controls said blower so that flow rates of air discharged by said blower in the air recirculation mode and the ventilation mode agree with each other.

3. An air conditioning system as set forth in claim 2, wherein said flow rate control circuit includes a target flow rate determining circuit, a correction value determining circuit, and a target flow rate correcting circuit, the target flow rate determining circuit determining a target flow rate of air discharged by said blower based on a preselected controlled air conditioning parameter, the correction value determining circuit determining correction values for correcting the target flow rate determined by said target flow rate determining circuit in the air recirculation mode and the ventilation mode, respectively, the correction value in the ventilation mode decreasing the target flow rate of air as the speed of the vehicle determined by said vehicle speed sensor increases, the target flow rate correcting circuit correcting the target flow rate determined by said target flow rate determining circuit using the correction values determined by said correction value determining circuit so that the flow rates of air discharged by said blower in the air recirculation mode and the ventilation mode agree with each other.

4. An air conditioning system as set forth in claim 1, wherein said mode selection prohibiting circuit also prohibits the mode selection operation of said automatic mode selecting circuit and selects the ventilation mode when a temperature of the air outside of the vehicle is smaller than a preselected value.

\* \* \* \* \*